United States Patent [19]

Holub et al.

[11] Patent Number: 4,873,287
[45] Date of Patent: Oct. 10, 1989

[54] FLAME RETARDANT TERNARY BLENDS OF POLYETHERIMIDE, POLYPHENYLENE ETHER AND BLOCK COPOLYMER OF A VINYL AROMATIC HYDROCARBON AND AN ALKENE COMPOUND

[75] Inventors: Fred F. Holub, Schenectady; Visvaldis Abolins, Bethlehem, both of N.Y.; John A. Rock, Becket, Mass.

[73] Assignee: General Electric Company, Pittsfield, Mass.

[21] Appl. No.: 139,575

[22] Filed: Dec. 30, 1987

[51] Int. Cl.$^4$ .................... C08L 53/00; C08L 71/04
[52] U.S. Cl. .................................... 525/92; 525/397; 525/905
[58] Field of Search .................... 525/92, 905, 397

[56] References Cited

U.S. PATENT DOCUMENTS

| | | | |
|---|---|---|---|
| 3,660,531 | 5/1972 | Lauchlan et al. | 525/92 |
| 4,431,779 | 2/1984 | White | 525/905 |
| 4,587,299 | 5/1986 | Giles, Jr. | 525/92 |

*Primary Examiner*—Jacob Ziegler
*Attorney, Agent, or Firm*—Bernard, Rothwell & Brown

[57] ABSTRACT

The present invention relate to a ternary polymer blend containing in admixture (a) a polyetherimide; (b) a polyphenylene ether; and (c) a block copolymer of a vinyl aromatic compound and an alkene compound. These ternary blends exhibit high glass transition temperatures and excellent flexural properties.

8 Claims, No Drawings

FLAME RETARDANT TERNARY BLENDS OF POLYETHERIMIDE, POLYPHENYLENE ETHER AND BLOCK COPOLYMER OF A VINYL AROMATIC HYDROCARBON AND AN ALKENE COMPOUND

BACKGROUND OF THE INVENTION

This invention is directed to molding compositions comprising flame retardant ternary blends of a polyetherimide, a polyphenylene ether and block copolymer of a vinyl aromatic compound and alkene compound of the A-B-A type.

Polyetherimide resins are well known in the art and are of considerable commercial value for use in molding compositions because of their excellent physical, chemical and thermal properties. The high glass transition and heat deflection temperatures exhibited by these polymers permit their use in high performance applications previously reserved for metals and some thermoset resins. While polyetherimides are generally known to have high glass transition temperatures, for many applications, it would be desirable to have a resin with a lower cost, yet which maintains the high glass transition temperatures and other advantageous physical properties of polyetherimides.

It is known that the cost of polyetherimides can be lowered by forming blends of those polymers with a polyphenylene ether polymer. See, White et al., U.S. Pat. 4,431,779. Although such blends maintain many of the physical properties of polyetherimides, it is desirable to have a polymer product with improved Izod impact values.

Binary blends of polyetherimides and block copolymers of a vinyl aromatic hydrocarbons and a diene hydrocarbon have been prepared for the primary purpose of improving the impact properties of the polyetherimide polyestercarbonates. See, Giles et al., U.S. Pat. No. 4,587,299. Again, although these blends exhibit certain advantageous properties, they have not been found to possess the desired low cost needed for a number of applications.

Thus, there exists a need for a polymer blend which exhibits low cost, high Izod impact values and improved flexibility than polyetherimides.

SUMMARY OF THE INVENTION

There is disclosed a ternary polymer blend comprising (a) a polyetherimide; (b) a polyphenylene ether of the structural formula:

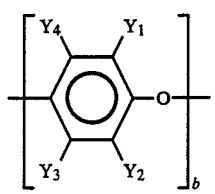

wherein the oxygen ether atom of one structural unit is connected to the benzene nucleus of the next adjoining unit, b is a positive integer and is at least 50 and $Y_1$, $Y_2$, $Y_3$ and $Y_4$, which may be the same or different, are monovalent substituents selected from the group consisting of hydrogen, halogen, hydrocarbon radicals, halo-hydrogen radicals having at least two carbon atoms between the halogen atom and the benzene nucleus, hydrocarboxy radicals and halohydrocarboxy radicals having at least two carbon atoms between the halogen atom and the benzene nucleus; and (c) a block copolymer of a vinyl aromatic compound (A) and an alkene compound (B) of the A-B-A type, the center block being of high molecular weight than that of the combined terminal blocks.

DETAILED DESCRIPTION OF THE INVENTION

The present invention relates to ternary polymer blends. More particularly, the invention relates to a unique ternary blend containing in admixture (a) a polyetherimide, (b) a polyphenylene ether, and (c) a block copolymer of a vinyl aromatic hydrocarbon and a alkene compound. These blends are characterized by low flammability, high thermal properties while exhibiting excellent flexural values.

The ternary blends of the present invention include a polyetherimide of the formula:

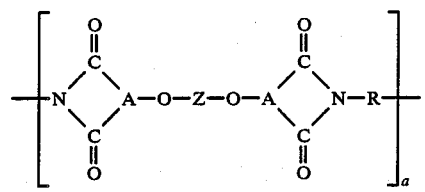

where "a" represents a whole number in excess of 1, e.g., 10 to 10,000 or more, the group —O—A is selected from

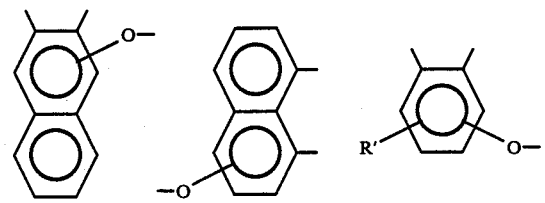

R' being hydrogen, lower alkyl or lower alkoxy and the divalent bonds of the —O—Z—O—radical are in the 3,3'; 3,4'; 4,3' or 4,4' position; Z is a member selected from the class consisting of (1):

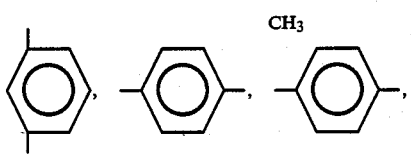

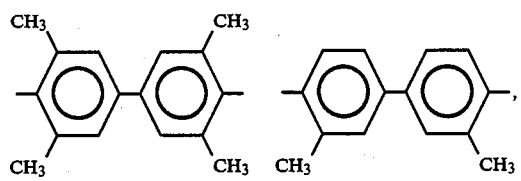

-continued

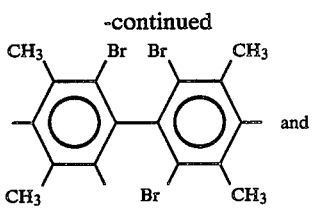
and

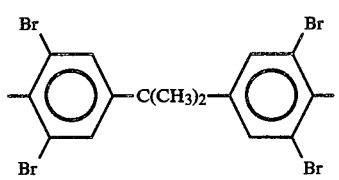

and (2) divalent organic radicals of the generl formula:

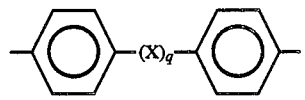

where X is a member selected from the class consisting of divalent radicals of the formulas,

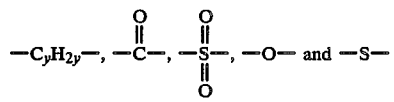

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from about 2 to about 20 carbon atoms, $C_{(2-8)}$ alkylene terminated polydiorganosiloxane, and (3) divalent radicals of the formula:

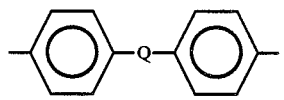

where Q is a member selected from the class consisting of:

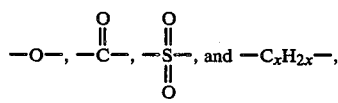

where x is a whole number from 1 to 5 inclusive.

The polyetherimides can be obtained by any of the methods well known to those skilled in the art including the reaction of any aromatic bis(ether anhydride) of the formula:

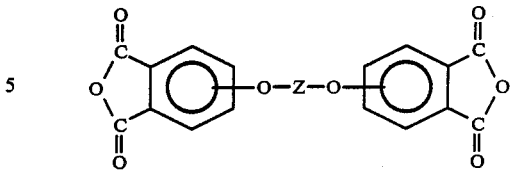

where Z is as defined above with an organic diamine of the formula $$H_2N-R-NH_2$$

where R is as defined above.

Aromatic bis(ether anhydride)s of the above formula include, for example, 2,2'bis[4-(2,3-dicarboxyphenoxy)-phenyl]-propane dianhydride; 4,4'-bis(2-dicarboxyphenoxy)diphenyl ether dianhydride; 1,3-bis(2,3 dicarboxyphenoxy)benzene dianhydride; 4,4'-bis(2,3-dicarboxyphenoxy)diphenyl sulfide dianhydride; 1,4-bis(2-dicarboxyphenoxy) benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)-diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy)diphenyl-2,2-propane dianhydride; etc., and mixtures of such dianhydrides.

In addition, aromatic bis(ether anhydride)s included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. No. 257,010, Nov. 11, 1969, Appl. May 3, 1967. Such dianhydrides are also shown by M. M. Koton, F. S. Florinski, *Zh. Org. Khin.;* 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonapthalene, 3,3'-dimethylbenzidine, 3,3'-dimethoxybenzidine, 2,4-bis(β-amino-t-butyl)toluene, bis(p-β-amino-t-butylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene bis(4-aminocyclohexyl)methane, 3-methylheptanethylenediamine, 4,4-dimethylheptamethylenediamine, 2,11-dodecanediamine, 2,2-dimethylpropylenediamine, octamentylenediamine, 3-methoxyhexamethyldiamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylene diamine, nonamethylenediamine, decamethylenediamine, bis(3-aminopropyl) tetramethyldisiloxane, bis(4-aminobutyl) tetramethyldisiloxane, etc. and mixtures of such diamines.

In general, the reactions can be advantageously carried out employing well-known solvents, e.g., o-dichlorbenzene, m-cresol/toluene, etc. in which to effect interaction between the dianhydrides and the diamines, at temperatures of from about 100° C. to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° C. to 400° C., and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed high molecular weight polyetherimides, however, in certain instances, a slight molar excess ( about 1 to 5 mole percent) of diamine can be employed resulting in the production of polyetherimides having terminal amine groups. Generally, useful polyetherimides have an intrinsic viscosity []of greater than 0.2 deciliters per gram, preferably 0.35 to 0.60 or 0.7 deciliters per gram or even higher when measured in m-cresol at 25° C.

The second component in the ternary blend of the present invention is a polyphenylene ether which has the repeating structural units of the formula:

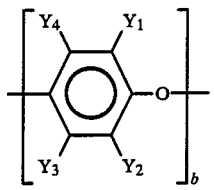

where the oxygen ether atom of one structural unit is connected to the benzene nucleus of the next adjoining unit, b is a positive integer and is at least 50, generally at least 100, and $Y_1$, $Y_2$, $Y_3$ and $Y_4$, which may be the same or different, are monovalent substituents selected from the group consisting of hydrogen, halogen, hydrocarbon radicals, halohydrocarbon radicals having at least two carbon atoms between the halogen atom and the benzene nucleus, hydrocarboxy radicals and halohydrocarboxy radicals having at least tow carbon atoms between the halogen atom and the benzene nucleus. Suitable hydrocarbon radicals include alkyl of one to ten carbon atoms and aryl of six to twenty carbon atoms. Preferred polyphenylene ethers for the purposes of the present invention include those where $Y_1$ and $Y_2$ are selected from alkyl of one to four carbon atoms and phenyl and $Y_3$ and $Y_4$ are hydrogen. Particularly preferred polyphenylene ethers for the purposes of the present ivnention are poly(2,6-dimethyl-1,4-phenylene)ether, i.e., $Y_1$ and $Y_2$ are methyl, poly(2,6-diphenyl-1,4 phenylene)ether, i.e., $Y_1$ and $Y_2$ are phenyl, and poly(2-methyl-6-phenyl-1,4-phenylene)ether, i.e., $Y_1$ is methyl and $Y_2$ is phenyl. Other suitable polyphenylene ethers include poly(2-benzyl-6-methyl-4-phenylene)ether and poly(2,6-dibenzyl-1,4 phenylene)ether.

Suitable methods for preparing polyphenylene ethers are disclosed in U.S. Pat. Nos. 3,306,874 and 3,306,875 to Hay and U.S. Pat. Nos. 3,257,357 and 3,257,358 to Stamatoff, incorporated herein by reference in their entirety. One method for preparing polyphenylene ethers comprises oxidizing a substituted phenol of the formula:

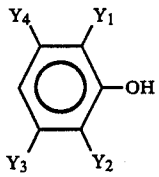

where $Y_1$ through $Y_4$ have the meanings set forth previously. Oxidation of the phenol can be accomplished by passing an oxygen containing gas through the phenol while in the presence of a catalyst such as a cuprous salt and a tertiary amine.

The third component in the ternary blend of the present invention is a block copolymer of a vinyl aromatic hydrocarbon and an alkene hydrocarbon. These block copolymers are well-known and are described, for instance, in *Polymer Chemistry of Synthetic Elastomers* edited by Kennedy et al., Interscience Publishers, Vol. 23, Part II (1969), pages 553-559. Such block copolymers are also described, for example, by Zelinski, U.S. Pat. No. 3,251,905, and Holden et al., U.S. Pat. No. 2,231,635 which are incorporated herein by reference.

In general, the block copolymer is represented by the formula, -A-B-A-, in which the terminal blocks, A, which can be the same or different, are thermoplastic homopolymers or copolymers prepared from a vinyl aromatic compound wherein the aromatic moiety can be either monocyclic or polycyclic. Examples of such vinyl aromatic compounds include styrene, alpha-methyl styrene, vinyl toluene, vinyl xylene, ethyl vinyl xylene, vinyl napththalene and the like, or mixtures thereof.

The center block, B, is an elastomeric polymer derived from an alkene hydrocarbon, such as ethylene and butylene and conjugated dienes, e.g., 1,3-butadiene, 2,3-dimethylbutadiene, isoprene, 1,3-pentadiene, and the like, or mixtures thereof.

The ratio of the copolymers and the average molecular weights of each can vary broadly. Frequently, however, the molecular weight of center block, B, will be greater than that of the continued terminal blocks, which appear to be necessary for optimum impact strength and solvent resistance. The molecular weight of terminal block, A, will preferably range from about 2,000 to about 100,000, while the molecular weight of center block, B, is preferably from about 25,000 to about 1,000,000.

If desired, the block copolymers can be post-treated to hydrogenate the rubber portion of the copolymer. Hydrogenation can be accomplished using conventional hydrogenation catalysts and reaction conditions.

With respect to the hydrogenated A-B-A block copolymers, it is preferred to form terminal block A having average molecular weight of from about 4,000 to about 115,000 and center block B having an average molecular eight of from about 20,000 to about 450,000. Still more preferably, the terminal block A will have an average molecular weight of from 8,000 to 60,000 while center block B still have an average molecular weight of from 50,000 to 300,000.

The terminal block can comprise from 2 to 48% by weight, preferably from 5 to 35% by weight of the block copolymer.

Particularly preferred hydrogenated block copolymers are those having a polybutadiene center block wherein from 35 to 55%, more preferably from 40 to 50% of the butanediene carbon atoms are vinyl side chains.

Hydrogenated block copolymers are described further by Jones, U.S. Pat. No. 3,431,323 and DeLaMare et al., U.S. Pat. No. 3,670,054, both of which are incorporated herein by reference.

In preferred blends, the second component will be an A-B—A block copolymer of the polystyrene-polybutadienepolystyrene type wherein the polybutadiene or polyisoprene portion can be either hydrogenated or non-hydrogenated. Particularly preferred are the A-B-A block copolymers of the styrene-ethylene-butylenestyrene (SEBS) type.

The above block copolymers of a vinyl aromatic hydrocarbon and a alkene hydrocarbon are well-known in the art. They are commercially available from Shell Chemical Company of Houston, Tex., under the trademark KRATON®. Particularly preferred are the KRATON®G grades that are of the SEBS type. The KRATON®G grades are available with varying styrene/rubber ratios, for example KRATON®G-1657 has a 14/86 styrene/rubber ratio while KRATON®G-1651 has a 33/67 styrene to rubber ratio.

The ternary blends of the present invention may contain a variety of proportions of the three polymers. With all weight percentages being based on the total weight of the three components combined, generally, the ternary blends comprise from about 1 to 94 percent by weight of polyetherimide, from about 1 to 94 percent by weight of polyphenylene ether, and from about 5 to about 20 percent by weight of block copolymer of a vinyl aromatic hydrocarbon and an alkene hydrocarbon. Preferably, the ternary blends of the present invention contain from about 5 to about 87 percent, by weight, polyetherimide, from about 5 to about 87 percent, by weight, polyphenylene ether, and from about 8 to about 15 percent, by weight, block copolymer of a vinyl aromatic hydrocarbon and an alkene hydrocarbon. By varying the relative weight percentages of each component, the ternary blends have improved properties over each polymer component alone or mixture of two of the components.

Methods for forming the ternary blends may vary considerably. Prior art blending techniques are generally satisfactory. A preferred method comprises blending the polymers and additives such as reinforcements in powder, granular or filamentous form, extruding the blend and chopping the extrudate into pellets suitable for molding by means conventionally used to mold normally solid thermoplastic compositions.

The suitable blends have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Alternatively, solutions of the blends herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinyl formal resins, epoxy resins, polyimides, polytetrafluoroethylene, etc. The use of the lines of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymer blends of the invention by incorporating such fillers as asbestos, glass fibers, talc, quartz, powder, finely divided carbon, and silica into the blends prior to molding. Shaped articles may be molded under heat, or under heat and pressure, in accordance with practices well-known in the art.

The following examples illustrate specific ternary blends in accordance with the present invention. It should be understood that the examples are given for the purpose of illustration and do not limit the invention. In the examples, all parts and percentages are by weight unless otherwise specified.

EXAMPLES

A series of ternary polymer blends were prepared by extrusion in a 28 mm Werner Pfleiderer twin screw extruder. The extrudate was chopped into pellets. The pellets were injection molded at temperatures ranging from 580 to 630° F. The molded specimens were then evaluated to determine their mechanical properties. The polyphenylene ether was added as a polyphenylene ether/SEBS 90/10 concentrate. The polyetherimide (PEI) that was used is marketed under the registered trademark Ultem® 1000 and is commercially available from General Electric Company of Pittsfield, Mass.

The polyphenylene ether (PPE) that was used is produced by General Electric Company under the registered trademark PPO®.

The block copolymer was KRATON®G-1651 which is a styrene-ethylene-butylene-styrene (SEBS) block copolymer and is commercially available from Shell Chemical Company of Houston, Tex.

The table below lists the proportions of each component of the ternary blend as well as the resulting properties. The flexural data was determined from tests based on ASTM Method D-790.

TABLE I

| Example | 1 | 2 | 3 | 4 | 5 | 6 |
|---|---|---|---|---|---|---|
| PEI | 25 | 50 | 75 | 25 | 50 | 75 |
| PPE | 65 | 40 | 15 | 65 | 40 | 15 |
| SEBS | 10 | 10 | 10 | 10 | 10 | 10 |
| Glass ⅛" | — | — | — | 20 | 20 | 20 |
| Tg (°C.) | 208 | 211 | 213 | 205 | 210 | 213 |
| HDT at 264° C. | 179 | 180 | 178 | 189 | 199 | 194 |
| Flexural Modulus (psi) | 346000 | 371000 | 374000 | 614000 | 751000 | 751000 |
| Flexural Strength Ultimate (psi) | 15950 | 16030 | 15569 | 13974 | 18152 | 16342 |

While the present invention has been described with reference to particular embodiments thereof, it will be apparent to those skilled in the art that numerous modifications may be made without actually departing from the spirit and scope of the invention as defined in the appended claims.

We claim:

1. A ternary polymer blend comprising (a) a polyetherimide; (b) a polyphenylene ether of the structural formula:

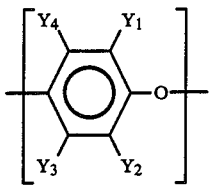

wherein the oxygen ether atom of one structural unit is connected to the benzene nucleus of the next adjoining unit, b is a positive integer and is at least 50 and Y₁, Y₂, Y₃ and Y₄, which may be the same or different, are monovalent substituents selected from the group consisting of hydrogen, halogen, hydrocarbon radicals, halo-hydrocarbon radicals having at least two carbon atoms between the halogen atom and the benzene nucleus, hydrocarboxy radicals and halohydrocarboxy radicals having at least two carbon atoms between the halogen atom and the benzene nucleus; and (c) a block copolymer of a vinyl aromatic compound (A) and an alkene compound (B), of the A-B-A type, the center block being of higher molecular weight than that of the combined terminal blocks.

2. The ternary polymer blend of claim 1, wherein said polyetherimide is of the formula:

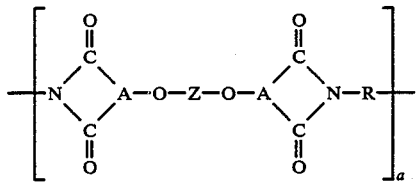

where "a" represents a whole number in excess of 1, e.g., 10 to 10,000 or more, the group —O—A is selected from:

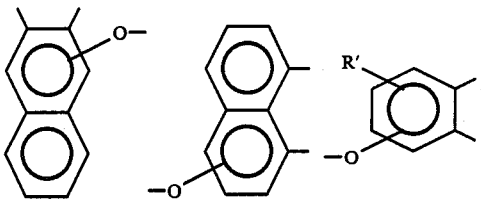

R' being hydrogen, lower alkyl or lower alkoxy; Z is a member selected from the class consisting of (1):

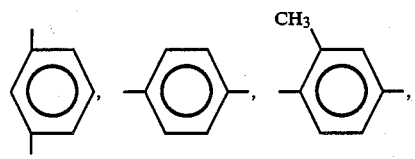

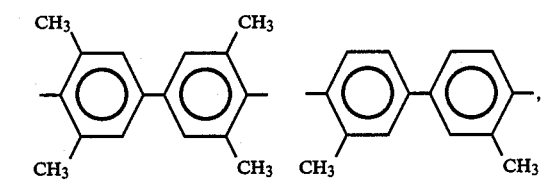

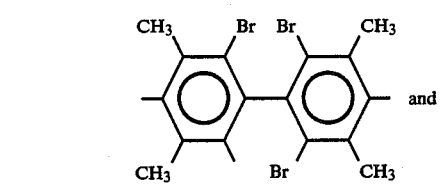

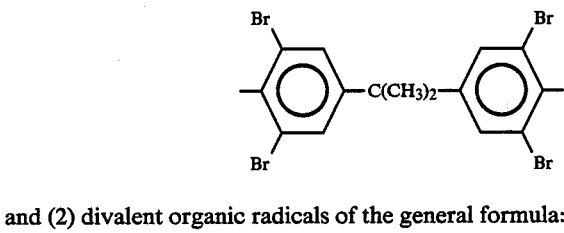

and (2) divalent organic radicals of the general formula:

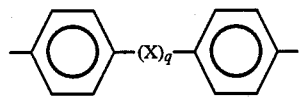

where X is a member selected from the class consisting of divalent radicals of the formulas,

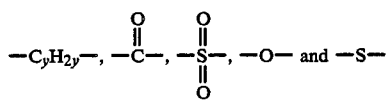

where q is 0 or 1, y is a whole number from 1 to 5, R is a divalent organic radical selected from the class consisting of (1) aromatic hydrocarbon radicals having from 6 to about 20 carbon atoms and halogenated derivative thereof, (2) alkylene radicals and cycloalkylene radicals having from about 2 to about 20 carbon atoms, C(2-8) alkylene terminated polydiorganosiloxane, and (3) divalent radicals of the formula:

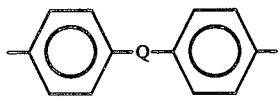

where Q is a member selected from the class consisting of

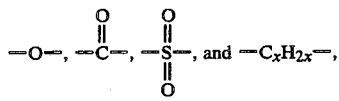

where x is a whole number from 1 to 5 inclusive.

3. The ternary polymer blend of claim 2 wherein Z is

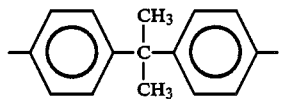

and R is selected from:

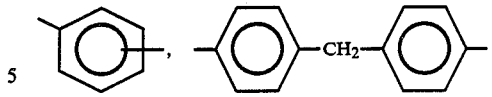

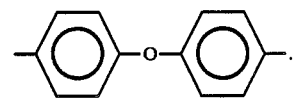

4. The ternary polymer blend of claim 3 wherein said polyetherimide is of the formula:

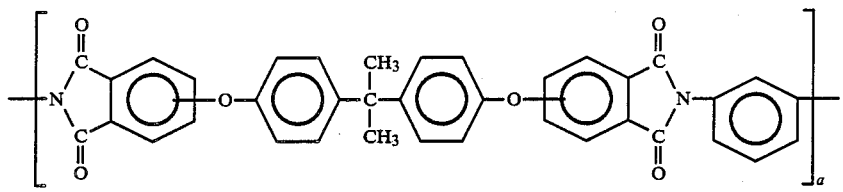

5. The ternary polymer blend of claim 1 wherein the vinyl aromatic compound is styrene and the alkene compound is selected from the group consisting of ethylene, butylene, isoprene, butadiene or mixtures thereof.

6. The ternary polymer blend of claim 5 wherein said alkene compound is ethylene and butylene.

7. The ternary polymer blend of claim 1 wherein said blend comprises from about 1 to about 94 percent by weight of said polyetherimide; from about 1 to about 94 percent by weight of said polyphenylene ether; and from about 5 to about 20 percent by weight of said block copolymer of a vinyl aromatic compound and an alkene compound.

8. The ternary blend of claim 7 wherein said blend comprises from about 5 to about 87 percent by weight of said polyetherimide; from about 5 to about 87 percent by weight of said polyphenylene ether; and from about 8 to about 15 percent by weight of said block copolymer of a vinyl aromatic compound and an alkene compound.

* * * * *